(12) United States Patent
Betz

(10) Patent No.: US 6,250,683 B1
(45) Date of Patent: Jun. 26, 2001

(54) BELT BUCKLE TENSIONER

(75) Inventor: Hans-Peter Betz, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/421,589

(22) Filed: Oct. 20, 1999

(30) Foreign Application Priority Data

Oct. 20, 1998 (DE) .......................................... 298 18 655 U

(51) Int. Cl.⁷ .................................................. B60R 22/36
(52) U.S. Cl. .......................................................... 280/806
(58) Field of Search .............................................. 280/806

(56) References Cited

U.S. PATENT DOCUMENTS

| | | | |
|---|---|---|---|
| 5,149,128 | * | 9/1992 | Föhl ....................... 280/806 |
| 5,313,690 | * | 5/1994 | Hiramatsu et al. ........... 280/806 |
| 5,671,949 | * | 9/1997 | Bauer et al. ............... 280/806 |
| 5,897,140 | | 4/1999 | Wier . |

FOREIGN PATENT DOCUMENTS

| | | |
|---|---|---|
| 4232569 | 3/1994 | (DE) . |
| 29609054 | 10/1996 | (DE) . |
| 0780271 | 6/1997 | (EP) . |

\* cited by examiner

*Primary Examiner*—Kenneth R. Rice
(74) *Attorney, Agent, or Firm*—Tarolli, Sundheim, Covell, Tummino & Szabo L.L.P.

(57) ABSTRACT

The invention relates to a belt buckle tensioner comprising a belt buckle unit provided with a belt buckle and a traction transfer device and further comprising a tensioner drive. The traction transfer device connects the belt buckle with the tensioner drive and displaces the belt buckle in a tensioning direction on activation of the tensioner drive. There is further provided at least one positive connection between the belt buckle unit and the tensioner drive, which in the non-activated state of the tensioner drive largely prevents at least one of a rotation and an axial displacement of the belt buckle unit with respect to the tensioner drive.

4 Claims, 4 Drawing Sheets

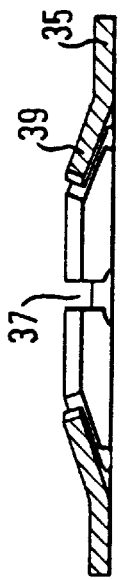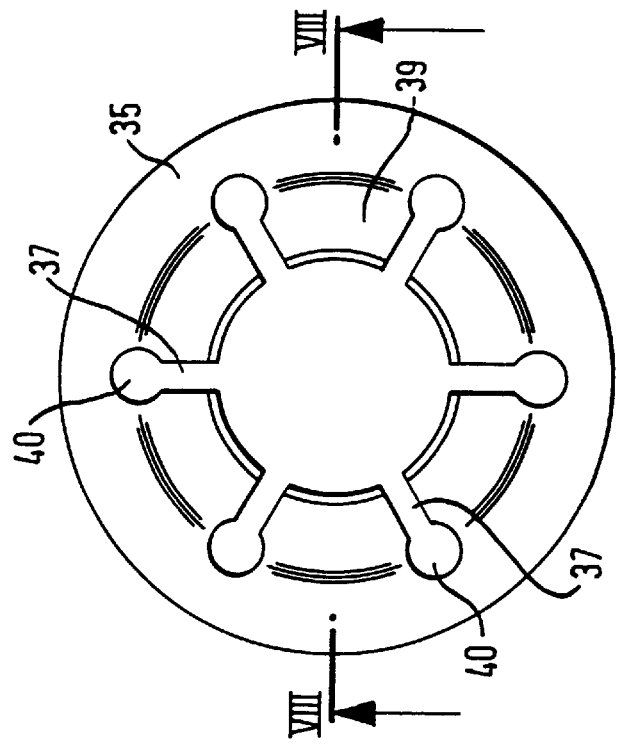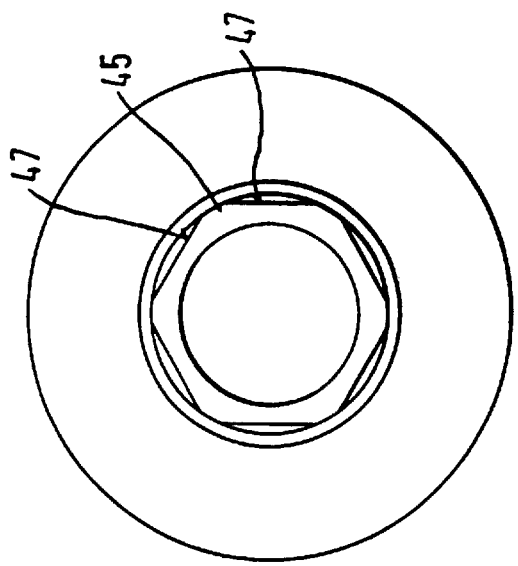

BELT BUCKLE TENSIONER

TECHNICAL FIELD

The invention relates to a belt buckle tensioner.

BACKGROUND OF THE INVENTION

The traction transfer means of vehicle seat belt buckle tensioners is usually constructed nowadays as a traction cable which is firmly connected with the belt buckle. This traction cable is coupled at the other end with the tensioner drive. When the tensioner drive is constructed as a piston/cylinder unit, the traction cable is fastened to the piston and extends through an end wall of the cylinder into its interior. A disadvantage in the belt buckle tensioners known hitherto is, however, that the belt buckle unit, i.e. the belt buckle together with the traction transfer means connected with it, can be displaced or turned unintentionally relative to the tensioner drive, for example whilst the vehicle is being cleaned. This undesired displacement of the belt buckle in axial direction or rotation of the belt buckle can lead to a smaller tensioning path or, in fact on rotation of the belt buckle, it can make the locking of the belt difficult.

BRIEF SUMMARY OF THE INVENTION

The invention provides a belt buckle tensioner, in which in the non-activated state of the tensioner drive the position of the belt buckle is always clearly established. This is achieved in a belt buckle tensioner which comprises a belt buckle unit provided with a belt buckle and a traction transfer means and further comprises a tensioner drive. The traction transfer means connects the belt buckle with the tensioner drive and displaces the belt buckle in a tensioning direction on activation of the tensioner drive. There is further provided at least one positive connection between the belt buckle unit and the tensioner drive, which in the non-activated state of the tensioner drive largely prevents at least one of a rotation and an axial displacement of the belt buckle unit with respect to the tensioner drive.

Whereas in the prior art, the seal and hence the friction between the traction transfer means and the cylinder wall is often used alone, in order to secure the belt buckle in position, in the belt buckle tensioner according to the invention a type of securing in the form of the positive connection is provided, which leads to a clear fixing in position.

Preferably, separate positive connections are provided on the one hand to prevent the rotation and on the other hand to prevent the axial displacement.

According to a development, the positive connection can be provided between the traction transfer means and the tensioner drive, the positive connection preferably engaging here between the housing of the tensioner drive and the belt buckle unit, in particular the traction transfer means itself.

If a piston/cylinder unit is used as tensioner drive, then one positive connection or several positive connections can be provided between the piston, coupled with the traction transfer means, and the cylinder.

If the cylinder is equipped with an end wall in which there sits a seal, then for a simplified production of the positive connection the seal itself can engage on the traction transfer means or the piston. The seal, which is of plastic or rubber material, can in fact then be produced in a non-cutting manner, so that corresponding projections or recesses can be easily constructed on the seal.

According to the preferred embodiment, a type of multiple-groove connection is provided as protection against torsion, between the piston and the seal.

As positive connection which prevents the axial displacement, a detent connection can be used for example which is unlocked on activation of the tensioner drive. The unlocking takes place in that the connection is released due to the drive forces.

The positive or, in other words, form-fitting connection to prevent an axial displacement preferably consists of a spring plate which is fastened on the one hand to the cylinder of a piston/cylinder unit and on the other hand to the traction transfer means. Fingers which are angled in axial direction on the spring plate increase the force which is necessary in order to release the lock.

BRIEF DESCRIPTION OF THE DRAWINGS

FIG. 6 shows a top view onto the end of the outer sleeve of the multiple-part piston, shown in the preceding Figures, which is inserted into the seal, FIG. 7 shows a top view onto the spring plate shown in FIGS. 2 and 3, and FIG. 8 shows a cross-sectional view along the line VIII—VIII in FIG. 7 through the spring plate.

DETAILED DESCRIPTION OF A PREFERRED EMBODIMENT

Figure 1:
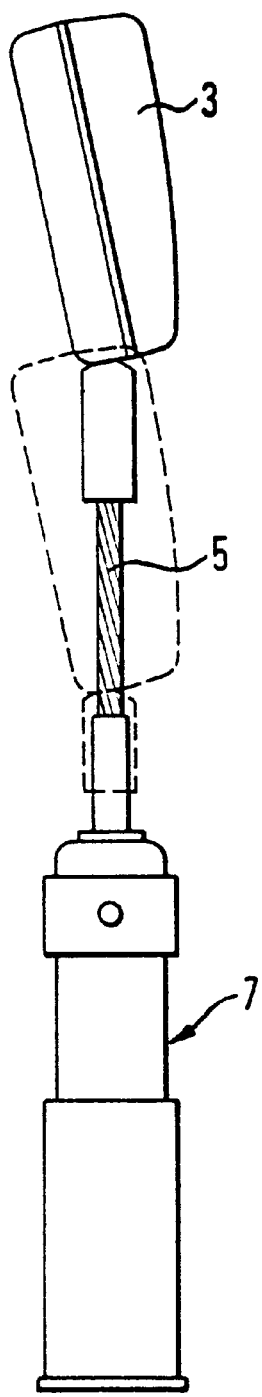
FIG. 1 shows a side view of the belt buckle tensioner according to the invention in the non-activated and activated state.
Figure 2:
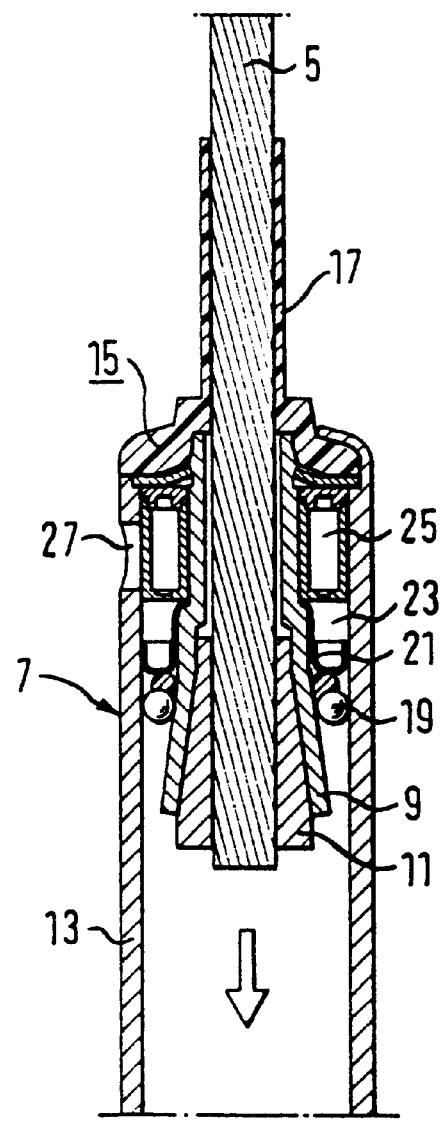
FIG. 2 shows a longitudinal sectional view through the piston/cylinder unit likewise shown in FIG. 1 in the region of the end facing the belt buckle.

In FIG. 1 a belt buckle tensioner is shown, which is fastened to a vehicle floor. The belt buckle tensioner consists of a belt buckle unit which in turn is formed from a belt buckle 3 and from a traction transfer means 5 in the form of a traction cable, and also from a tensioner drive 7 in the form of a piston/cylinder unit. The belt buckle 3 in the non-activated state of the tensioner drive 7 is illustrated by solid lines and by broken lines after the activation of the tensioner drive and after the belt tensioning has been completed. The traction transfer means 5 couples the belt buckle 3 with the tensioner drive 7. It is arranged on the one hand in a positive manner on the belt buckle 3 and on the other hand on the multiple-part piston shown in FIG. 2. The piston consists of an outer sleeve 9 and of an inner sleeve 11 which are both shaped conically so that a type of keying is produced. The inner sleeve 11 is pressed onto the traction transfer means 5. The arrow shown in FIG. 2 indicates the tensioning direction. The cylinder forming a housing is designated by reference number 13, which has an end wall which is largely formed by a seal 15. The seal 15 has a neck-shaped long section 17 which projects to the belt buckle 3 and, at the end of the tensioning process, acts as a damping device by the section 17 being deformed in a plastic manner by the belt buckle striking onto it. Further known arrangements of a tensioner drive 7, shown in FIG. 2, in the form of a piston/cylinder unit are a roll body 19 to lock the piston after the tensioning has been completed, a further seal 21 which delimits the working space 23 and is fastened to the outer sleeve 9, and also a gas generator 25 which is ignited via an opening 27 in the cylinder 13.

Figure 3:
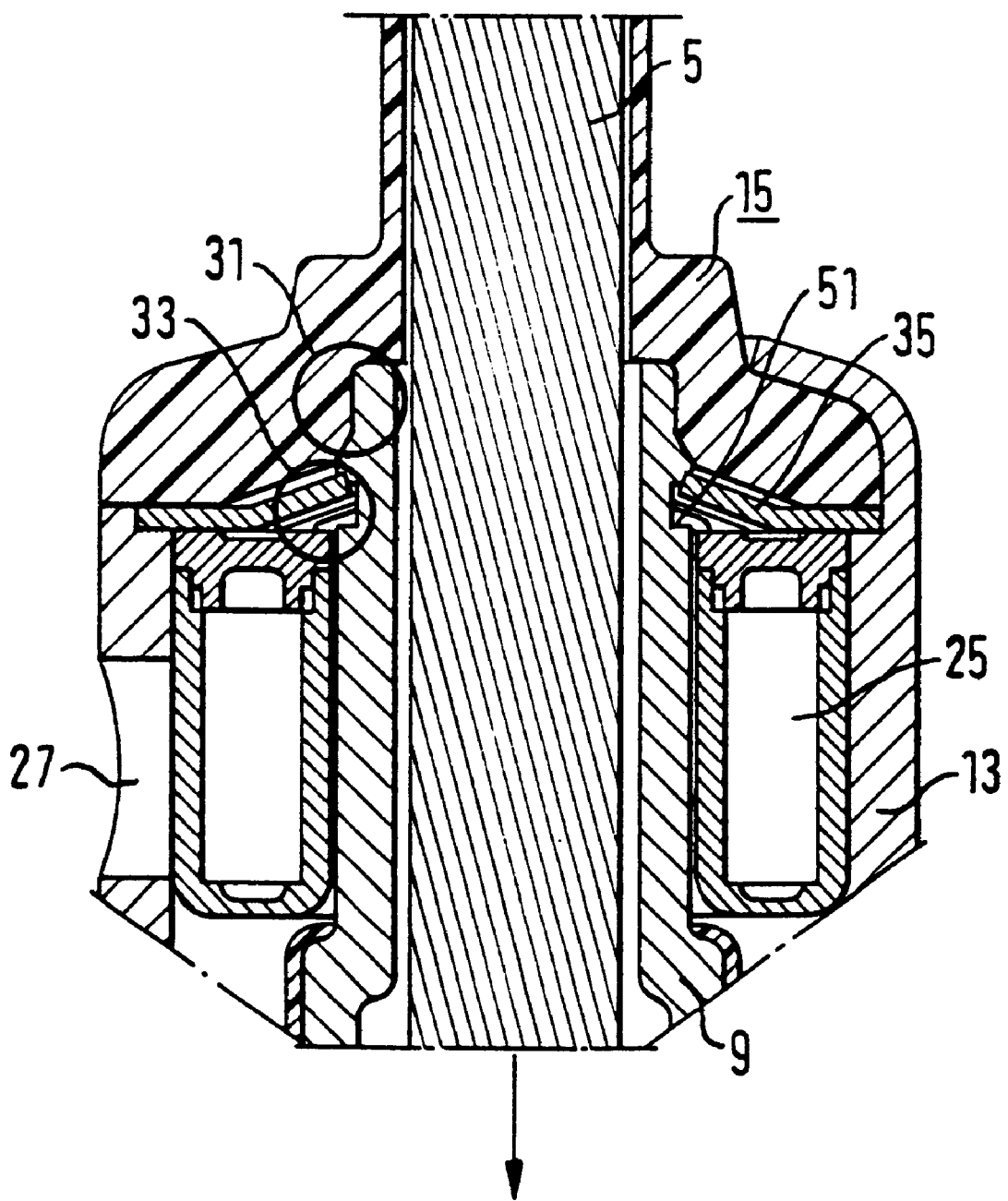
FIG. 3 shows an enlarged view of the end of the piston/cylinder unit shown in FIG. 2.

In FIG. 3 some of the aforementioned parts can be better seen.

Two positive connections are provided which are intended to prevent the belt buckle unit, in particular the belt buckle 3 itself, from being rotated unintentionally with the non-activated tensioner drive or from being displaced in axial direction, more precisely in tensioning direction. The first positive connection 31 is provided between the outer sleeve 9 at its end on the belt buckle side and the seal 15 acting as end wall. In FIG. 3 the first positive connection 31 is framed by a circle. The first positive connection 31 serves to secure the traction transfer means 5 and hence the belt buckle 3 against rotation. This first positive connection 31 does not allow the piston not to be turned when the tensioner drive is not activated. As the traction transfer means 5 is firmly connected with the piston and at the opposite end is firmly connected with the belt buckle 3, the belt buckle 3 is also fixed in position in tensioning direction via the first positive connection 31. A slight rotation can only take place through torsion of the traction transfer means 5, however this is very small and does not impede the handling of the belt buckle 3 in any way, so that it can be accepted.

The second positive connection 33, which is characterized in FIG. 3 at one location by framing, prevents an axial displacement of the traction transfer means 5 and hence of the belt buckle 3 in tensioning direction. This second positive connection 33 is likewise provided between the cylinder 13 and the piston, more precisely the outer sleeve 9. Whilst the first positive connection 31 is formed directly between the outer sleeve 9 and the seal 15 as part of the cylinder 13, in the second positive connection 33 an intermediate part is provided in the form of a spring plate 35. The spring plate 35 is clamped at its outer peripheral edge between the end of the covering surface of the cylinder 13 on the end face and the seal 15. The plate 35 has a central opening, is therefore constructed in a ring shape, the outer sleeve 9 extending through the opening. Between the spring plate 35, firmly arrested on the cylinder 13, and the outer sleeve 9 a detent connection is formed. This connection, as explained in further detail later, is released on activation of the tensioner drive.

Figure 5:
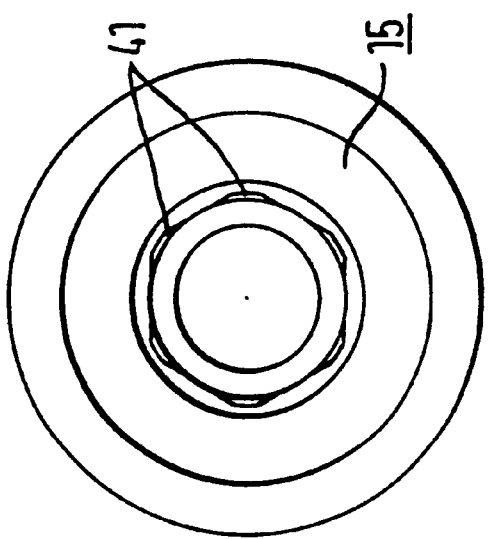
FIG. 5 shows a view of the seal shown in FIG. 4 in the direction of the arrow shown in FIG. 4.
Figure 4:
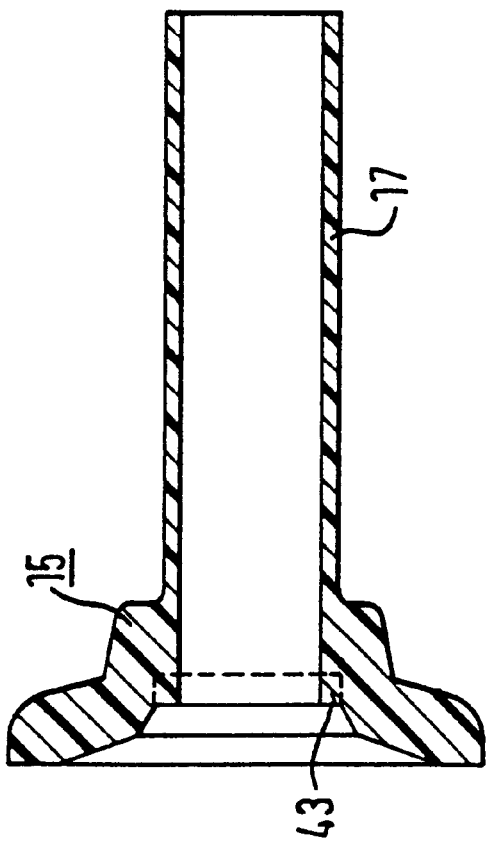
FIG. 4 shows a longitudinal sectional view of the seal shown in FIG. 2 and FIG. 3.

With the aid of FIGS. 4 and 6, the first connection 31 is now described in further detail. The positive connection 31 is formed by several grooves and projections which run axially and represents a type of multiple-groove connection. The seal 15 has on its end face on the piston side a recess with a profile, transferring a torque, in the form of numerous grooves 41 distributed uniformly on the periphery (cf. FIG. 5). In FIG. 4, reference number 43 shows the region in which these grooves are situated. They extend only over a small axial length into the seal 15. As the seal 15 consists of cast plastic, the necessary profile can be produced very simply. Projections 45 on the end of the outer sleeve 9 on the belt buckle side engage into the grooves 41 (cf. FIG. 6). At this end, the outer sleeve 9 has a type of hexagonal profile, viewed in top view, similar to a screw head. The projections 45 form the transition between flattened adjacent regions 47.

On assembling the belt buckle tensioner, the projections 45 only engage into the grooves 41 when the piston has been pushed approximately completely upwards. Vice versa, the first positive connection 31 is already released shortly after activation of the gas generator 25, by the projections 45 being moved in tension direction out from the grooves 41. The numerous projections 45 and grooves 41 form the advantage that not only one but several angle positions are possible between the belt buckle 3 and the tensioner drive 7. Thereby, depending on the vehicle type and the installation situation, the optimum angle position of the belt buckle 3 to the tensioner drive 7 in the non-activated state of the tensioner drive 7 can be established.

For better explanation of the second positive connection 33, the spring plate 35 is illustrated in further detail in FIGS. 7 and 8. The outer periphery of the spring plate is continuous, whereas the spring plate 35 is slotted several times on the inner face so that fingers 39 are produced between the slots 37. Each slot 37 ends, moreover, in a circular round hole 40 for tension distribution. The fingers 39 are angled in axial direction (cf. FIG. 8) slightly axially to the belt buckle 3 and hence contrary to the tensioning direction. This angling of the fingers 39 contrary to the tensioning direction produces a type of spreading effect which increases the force to be applied in tensioning direction, which is necessary for disengaging the fingers from a groove 51 in the outer sleeve 9, into which the fingers 39 engage (cf. FIG. 3).

The angle at which the fingers 39 are angled, the thickness of the spring plate 35 and also the covering surface between the groove 51 and the fingers 39 determine inter alia this force which is to be applied. The force must therefore be arranged such that it is easily achieved and exceeded through the gas pressure on igniting of the gas generator 25. On the other hand, it must be large enough so that an inadvertent butting against the belt buckle 3 does not lead to an axial displacement of the belt buckle 3.

In the case of restraint, an igniter which is not shown triggers the gas generator 25. This generates gas which flows into the working space 23 and displaces the piston, the traction transfer means 5 and the belt buckle 3 in tensioning direction. This displacement is only possible when the force generated by the gas generator is greater than the locking force between the spring plate 35 and the outer sleeve 9. Then the second positive connection 33 is released by the fingers 39 snapping downwards. The outer sleeve 9 and hence the entire piston can move downwards, it also being able to happen that the upper edge of the groove 51 slides along the fingers 39 and is pulled out.

The first positive connection 31 is already released after a few millimeters, so that the belt buckle 3 together with the traction transfer means 5 can adapt itself to the optimum position during the tensioning process. As the seal 15 and the outer sleeve 9 already detach themselves from each other after a short tensioning path, no more forces leading to a friction will occur in circumferential direction between these two parts, which could reduce the tensioning effect.

The detent connection by means of the spring plate 35, acting in axial direction, can also take place exclusively through plastic deformation or destruction of one or more parts ensuring the connection.

What is claimed is:

1. A belt tensioner, comprising:
   a belt buckle unit provided with a belt buckle and a traction transfer means,
   a tensioner drive;
   said traction transfer means connecting said belt buckle with said tensioner drive and displacing said belt buckle in a tensioning direction on activation of said tensioner drive, and
   at least one positive connection between said belt buckle unit and said tensioner drive, which in the non-activated state of said tensioner drive largely prevents at least one of a rotation and an axial displacement of said belt buckle unit with respect to said tensioner drive, wherein said tensioner drive comprises a housing and said positive connection is provided between said belt buckle unit and said housing, wherein said tensioner drive is a piston/cylinder unit with a cylinder and a piston within said cylinder, wherein said positive connection is provided between said piston and said cylinder, wherein said piston is coupled with said traction transfer means, and wherein said cylinder forms said housing, wherein said cylinder has an end wall through which said traction transfer means extends, and wherein said end wall is formed at least partially by a seal which engages on said traction transfer means, wherein said positive connection is formed by a positive fit between seal and piston, and wherein said piston and said seal are connected with each other by at least one projection which engages into a groove.

2. The belt buckle tensioner according to claim 1, wherein said piston and said seal are connected with each other in a direction of rotation by a splined shaft profile.

3. A belt tensioner, comprising:

a belt buckle unit provided with a belt buckle and a traction transfer means, a tensioner drive, said traction transfer means connecting said belt buckle with said tensioner drive and displacing said belt buckle in a tensioning direction on activation of said tensioner drive, and at least one positive connection between said belt buckle unit and said tensioner drive, which in the non-activated state of said tensioner drive largely prevents at least one of a rotation and an axial displacement of said belt buckle unit with respect to said tensioner drive, said positive connection preventing an axial displacement and is constructed as a latching connection which is unlocked on activation of said tensioner drive, and wherein said tensioner drive has a piston/cylinder unit and said positive connection preventing an axial displacement has a spring plate surrounding said traction transfer means, said spring plate being fastened with its radial outer side to said cylinder and with its radial inner side to one of said piston and said traction transfer means.

4. The belt buckle tensioner according to claim 3, wherein said spring plate has a plurality of fingers which are bent in axial direction.

* * * * *